(12) United States Patent
Jeong et al.

(10) Patent No.: US 11,987,009 B2
(45) Date of Patent: May 21, 2024

(54) HEATER FOR SEALING PROCESS OF SECONDARY BATTERY

(71) Applicant: Jong Hong Jeong, Chungcheongbuk-do (KR)

(72) Inventors: Jong Hong Jeong, Chungcheongbuk-do (KR); Sang Jin Kim, Daejeon Metropolitan (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 336 days.

(21) Appl. No.: 17/426,738

(22) PCT Filed: Jul. 24, 2020

(86) PCT No.: PCT/KR2020/009789
§ 371 (c)(1),
(2) Date: Jul. 29, 2021

(87) PCT Pub. No.: WO2021/015589
PCT Pub. Date: Jan. 28, 2021

(65) Prior Publication Data
US 2022/0102783 A1 Mar. 31, 2022

(30) Foreign Application Priority Data
Jul. 24, 2019 (KR) .......................... 10-2019-0089867

(51) Int. Cl.
*B29C 65/00* (2006.01)
*H01M 50/105* (2021.01)

(52) U.S. Cl.
CPC ....... *B29C 66/1122* (2013.01); *H01M 50/105* (2021.01)

(58) Field of Classification Search
CPC ..... B29C 65/18; B29C 65/20; B29C 66/1122; B29C 66/91212; H01M 50/105
USPC ........................................................ 156/308.4
See application file for complete search history.

(56) References Cited

U.S. PATENT DOCUMENTS 6,342,115 B1 * 1/2002 Pourmand ............... B30B 15/34
156/359

FOREIGN PATENT DOCUMENTS

| JP | H07-156245 A | 6/1995 |
| JP | 2000-277893 A | 10/2000 |
| KR | 10-2012-0052041 A | 5/2012 |

(Continued)

OTHER PUBLICATIONS

International Search Report from corresponding PCT Application No. PCT/KR2020/009789, dated Nov. 3, 2020.

*Primary Examiner* — James D Sells
(74) *Attorney, Agent, or Firm* — Harness, Dickey & Pierce, P.L.C.

(57) ABSTRACT

A disclosed heater for a sealing process of a secondary battery includes: a sealing bar heating and pressing a pouch foil to be sealed; a plurality of sub-heating unit longitudinally disposed inside the sealing bar to respectively independently supply heat to a plurality of sections separated in the longitudinal direction of the sealing bar; temperature sensing units disposed inside the sealing bar and sensing temperature at positions on the surfaces being in contact with the pouch foil; and a control unit controlling heating temperature of the plurality of sub-heating units on the basis of the temperature sensed by the temperature sensing units.

6 Claims, 3 Drawing Sheets

(56) References Cited

FOREIGN PATENT DOCUMENTS

KR 10-1762807 B1 7/2017
KR 10-2017-0126642 A 11/2017

\* cited by examiner

HEATER FOR SEALING PROCESS OF SECONDARY BATTERY

CROSS-REFERENCE TO RELATED APPLICATIONS

This application is a national phase application of PCT Application No. PCT/KR2020/009789, filed on Jul. 24, 2020, which claims the benefit and priority to Korean Patent Application No. 10-2019-0089867, filed on Jul. 24, 2019. The entire disclosures of the applications identified in this paragraph are incorporated herein by references.

TECHNICAL FIELD

The present disclosure relates to a heater for a sealing process of a secondary battery, in detail, the structure of a heater that can prevent poor sealing due to non-uniform heating in a sealing process of a secondary battery pouch foil.

BACKGROUND ART

This section provides background information related to the present disclosure which is not necessarily prior art.

A common pouch-type secondary battery cell has a structure in which electrode assemblies each including cathode and anode plates, and a separator are stacked and accommodated with an electrolyte in a pouch foil. The pouch foil has a bag structure having a sealed part with ends closed by thermal bonding.

The pouch foil having a sealed part and sealed from the outside protects the electrode assemblies accommodated therein from external physical shock. Further, the pouch foil prevents the electrolyte accommodated therein from chemically reacting with the external environment or from leaking to the outside. Further, chemical denaturation of the exposed end surface of the pouch foil is prevented, whereby damage to the pouch foil itself is prevented.

Accordingly, the sealed part of the pouch foil has to have a uniform sealing characteristic in the longitudinal direction in a pouch-type secondary battery.

FIG. 1 shows a heater structure that is employed in a sealing process of a pouch-type secondary battery in the related art.

Referring to FIG. 1, the heater structure includes a heater block p10 having a heater (a heat coil) p11 in the center and sealing a pouch foil 1 by pressing the pouch foil 1, a cylinder p20 moving up and down the heater block p10 and providing a force that presses the pouch foil 1, and an isolator p30 inserted between the cylinder p20 and the heater block p10 and preventing heat transfer from the heater block p10 to the cylinder p20.

According to the heater structure that is employed in a sealing process of a pouch-type secondary battery in the related art shown in FIG. 1, the cylinder p20 is disposed at the center of the heater block p10 and a force is applied to the heater block p10.

In the heater block described above, the force of the heater block p10 pressing the pouch foil 1 is not uniform. Accordingly, the amount of heat transferring from the heater block p10 to the pouch foil 1 is not uniform.

Further, the pressure that presses the heater block p10 for sealing is not uniform, depending on positions, in the longitudinal direction of the heater block, so a loss of thermal conduction is caused by contact between the isolator and the heater block p10.

The heater p11 is inserted in the heater block p10 and elongated from a side in the longitudinal direction of the heater block p10. The larger the distance from a side to which a current is supplied to the heater p11, the larger the resistance, so more heat is generated.

That is, there is a problem that it is difficult to keep the temperature of the heater p11 itself uniform in the longitudinal direction of the heater p11.

Further, the temperature is not uniform due to a partial air contact loss of the heater block p10 having the heater p11 therein.

Most of the surface of the heater block p10 is exposed in the air in the region A shown in FIG. 1. However, the center portion of the heater block p10 is not in contact with air by the isolator p30 and the cylinder p20.

Accordingly, heat is continuously dissipated from the surface of the heater block p10 in the region A. The heat dissipation in the region A is one of the factors that make it difficult to keep temperature uniform in the longitudinal direction of the heater block p10.

SUMMARY

Technical Problem

An aspect of the present disclosure provides a heater for a sealing process of a secondary battery, the heater having a structure that may prevent poor sealing due to non-uniform heating in a sealing process of a secondary battery pouch foil.

An aspect of the present disclosure also provides a heater for a sealing process of a secondary battery, the heater being able to keep heating temperature uniform against an increase of the length of a secondary battery.

Technical Solution

This section provides a general summary of the disclosure and is not a comprehensive disclosure of its full scope or all of its features.

According to an aspect of the present disclosure, there is provided a heater for a sealing process of a secondary battery, which includes: a sealing bar heating and pressing a pouch foil to be sealed; a plurality of sub-heating unit longitudinally disposed inside the sealing bar to respectively independently supply heat to a plurality of sections separated in the longitudinal direction of the sealing bar; temperature sensing units disposed inside the sealing bar and sensing temperature at positions on the surfaces being in contact with the pouch foil; and a control unit controlling heating temperature of the plurality of sub-heating units on the basis of the temperature sensed by the temperature sensing units.

The heater for a sealing process of a secondary battery according to an aspect of the present disclosure further includes a common heating unit longitudinally disposed inside the sealing bar to supply heat to all of the sections covered by the plurality of sub-heating units.

In the heater for a sealing process of a secondary battery according to another aspect of the present disclosure, the sealing bar has an accommodation groove in which the common heating unit is disposed, and the plurality of sections to which heat is supplied by the plurality of sub-heating units covers the entire length of the accommodation groove.

In the heater for a sealing process of a secondary battery according to another aspect of the present disclosure, the common heating unit and the plurality of sub-heating units each have a current controller controlling the amount of input current and are independently controlled by the current controllers.

In the heater for a sealing process of a secondary battery according to another aspect of the present disclosure, the common heating unit and the plurality of sub-heating units are heat coils.

Advantageous Effects

In order to solve the problems, in the heater for a sealing process of a secondary battery according to any one of various aspects of the present disclosure, the plurality of sub-heating units is arranged such that the gaps therebetween increase toward the center portion from both longitudinal ends of the sealing bar.

In the heater for a sealing process of a secondary battery according to another aspect of the present disclosure, heat dissipation efficiency of the sealing bar decreases toward both longitudinal ends from the center portion thereof.

DETAILED DESCRIPTION

Hereafter, embodiments of a heater for a sealing process of a secondary battery according to the present disclosure are described in detail with reference to the drawings.

However, it should be noted that the intrinsic spirit of the present disclosure should not be construed as being limited to embodiments to be described hereafter and includes a range easily proposed by replacing or changing embodiments to be described below by those skilled in the art on the basis of the intrinsic spirit of the present disclosure.

Further, the terms to be used hereafter are selected for the convenience of description and should be appropriately construed as meanings coinciding with the intrinsic spirit of the present disclosure, not being limited to the meanings in dictionaries when finding out the spirit of the present disclosure.

Figure 1:
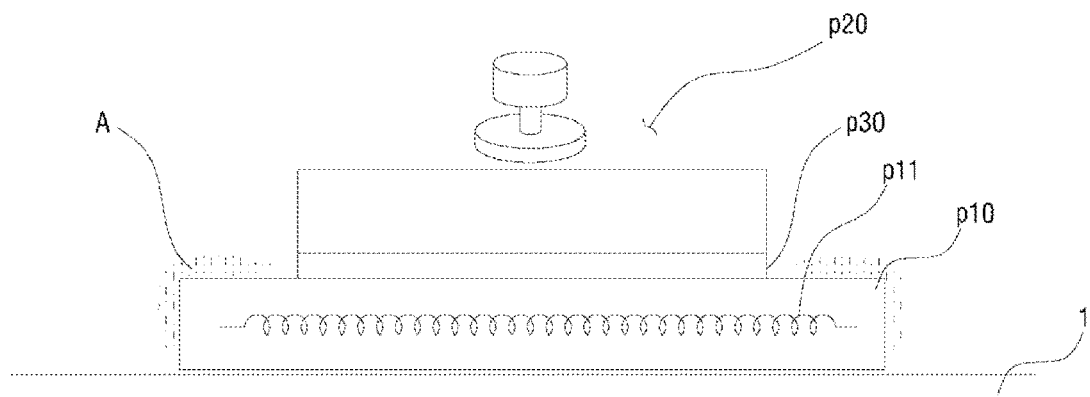
FIG. 1 is a view illustrating a heater for a sealing process of a secondary battery in the related art.
Figure 2:
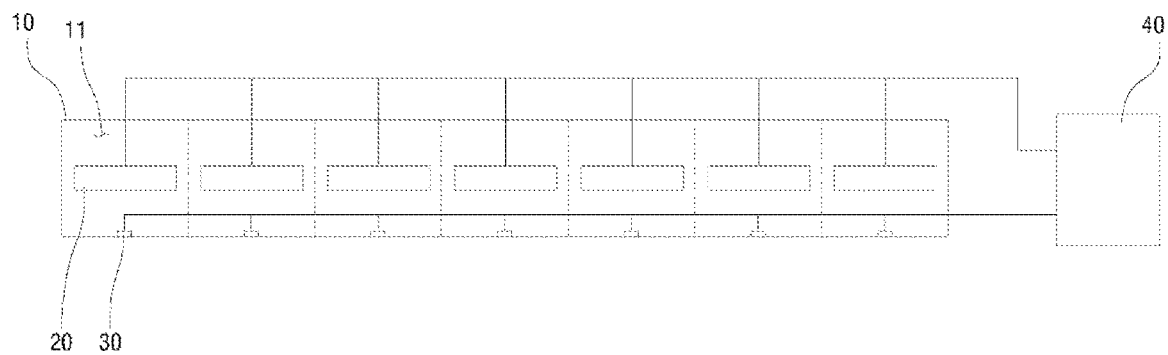
FIG. 2 is a view illustrating a heater for a sealing process of a secondary battery according to the present disclosure.

FIG. 2 is a view illustrating a heater for a sealing process of a secondary battery according to the present disclosure.

Referring to FIG. 2, a heater for a sealing process of a secondary battery according to the present embodiment includes a sealing bar 10, a plurality of sub-heating units 20, a plurality of temperature sensing units 30, and a control unit 40.

The sealing bar 10 heats and presses a pouch foil to be sealed.

The plurality of sub-heating units 20 is longitudinally disposed inside the sealing bar 10 to respectively independently supply heat to a plurality of sections 11 separated in the longitudinal direction of the sealing bar 10.

The temperature sensing units 30 are disposed inside the sealing bar 10 and sense temperature at positions on the surfaces being in contact with the pouch foil.

The control unit 40 controls heating temperature of the plurality of sub-heating units 20 on the basis of the temperature sensed by the temperature sensing units 30.

Since the heater for a sealing process of a secondary battery according to the present disclosure controls the temperature of the sealing bar 10 at a plurality of separate sections, it is possible to achieve a uniform sealing quality regardless of the sealing position of a pouch foil.

Figure 3:
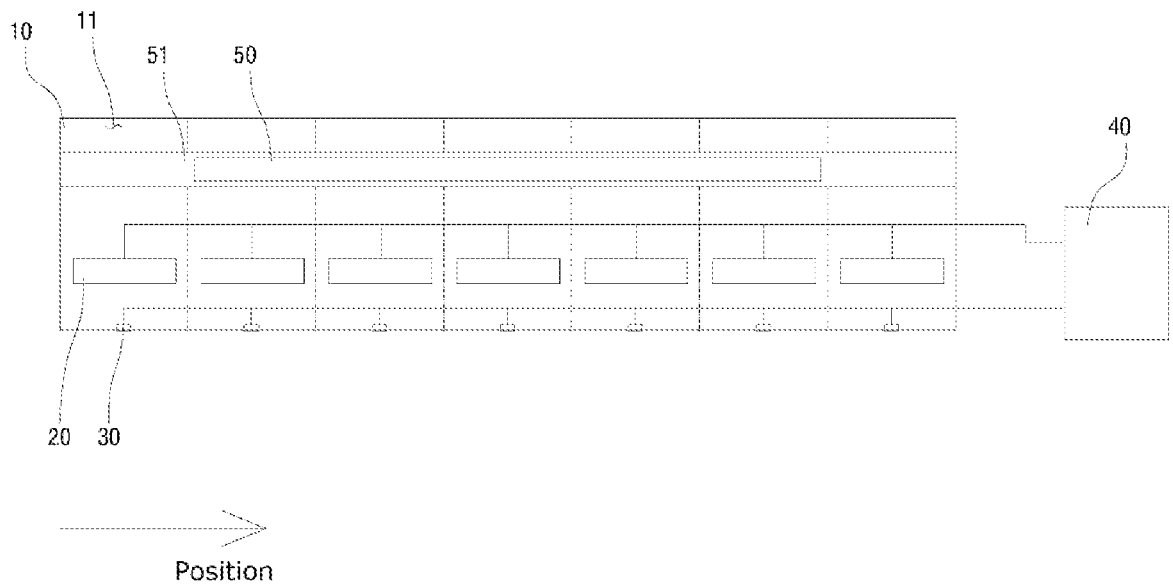
FIG. 3 is a view illustrating a common heating unit.
Figure 4:
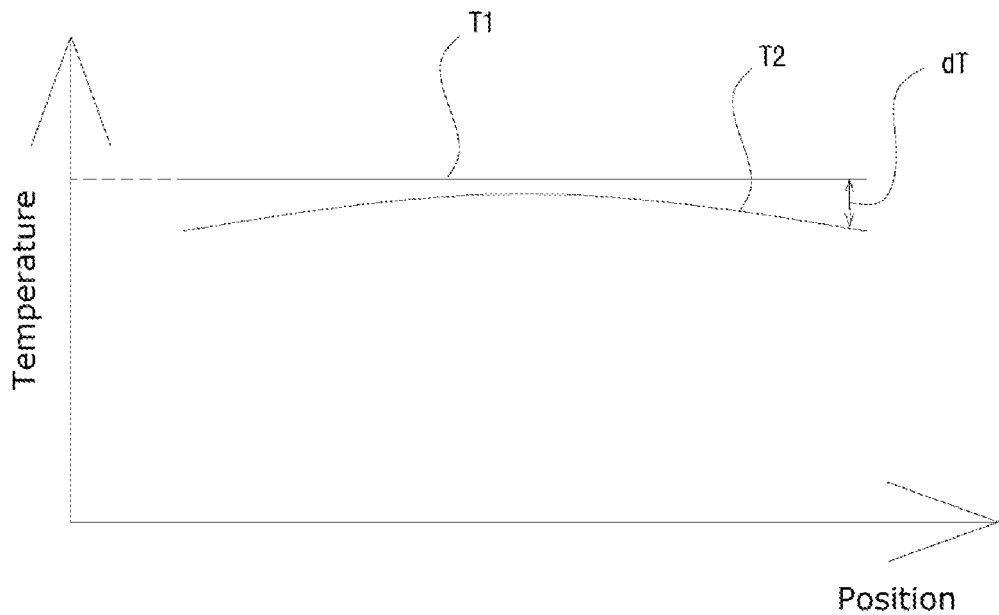
FIG. 4 is a view illustrating the operation relationship between the common heating unit and a sub-heating unit.

FIG. 3 is a view illustrating a common heating unit and FIG. 4 is a view illustrating the operation relationship between the common heating unit and a sub-heating unit.

Referring to FIG. 3, the heater for a sealing process of a secondary battery according to the present embodiment includes a common heating unit 50 longitudinally disposed inside the sealing bar 10 to supply heat to all of the sections covered by the plurality of sub-heating units 20.

Referring to FIG. 3, in the heater for a sealing process of a secondary battery according to the present embodiment, the sealing bar 10 has an accommodation groove 51 in which the common heating unit 50 is disposed, and the plurality of sections 11 to which heat is supplied by the plurality of sub-heating units 20 covers the entire length of the accommodation groove 51.

The common heating unit 50 simultaneously supplies heat to the plurality of sections 11, whereby temperature control by the plurality of sub-heating units 20 becomes more precise.

Referring to FIG. 4, it can be seen that the plurality of sub-heating units 20 may precisely control temperature due to the heat supplied by the common heating unit 50.

The horizontal axis in FIG. 4 is the transverse position in FIG. 3.

A specific amount of heat is supplied to each of the plurality of sections 11 by the heat supplied from the common heating unit 50, whereby the temperature of the entire sealing bar 10 is increased.

The temperature difference dT between a sealing temperature line T1 and a temperature line T2 showing heating by the common heating unit 50 decreases.

The sealing temperature line T1 shows temperature at positions on the sealing bar 10 which is required to sealing the pouch foil.

As shown in FIG. 4, when the common heating unit 50 is operated and heats the sealing bar 20 up to the temperature line T2, the plurality of sub-heating units 20 has only to heat the plurality of sections 11 by the temperature difference dT, respectively.

The temperature difference dT corresponds to a range smaller than the sealing temperature line T1, the plurality of sub-heating units 20 may precisely control the temperature of the plurality of sections 11.

Since the plurality of sections 11 is heated within a small temperature range, temperature control takes a short time, so a temperature change over time may be minimized.

If the common heating unit 50 is not employed and there is no heat supply by the common heating unit 50, the plurality of sub-heating units 20 has to heat the plurality of sections 11 up to the sealing temperature value.

That is, the temperature has to be precisely controlled within a large temperature range, so there is a problem that the equipment may be increased in size and expensive parts are required.

However, as can be seen in FIGS. 3 and 4, when the common heating unit 50 is employed, the plurality of sub-heating units 50 may control the temperature for the plurality of sections 11 within a small temperature range.

Referring to FIG. 4, the temperature difference dT may depend on positions. This means that the heat transferring from the common heating unit 50 is not uniform in the longitudinal direction of the sealing bar 10.

It is possible to separately control different temperature differences dT at different positions by using the plurality of sub-heating units 20.

Figure 5:
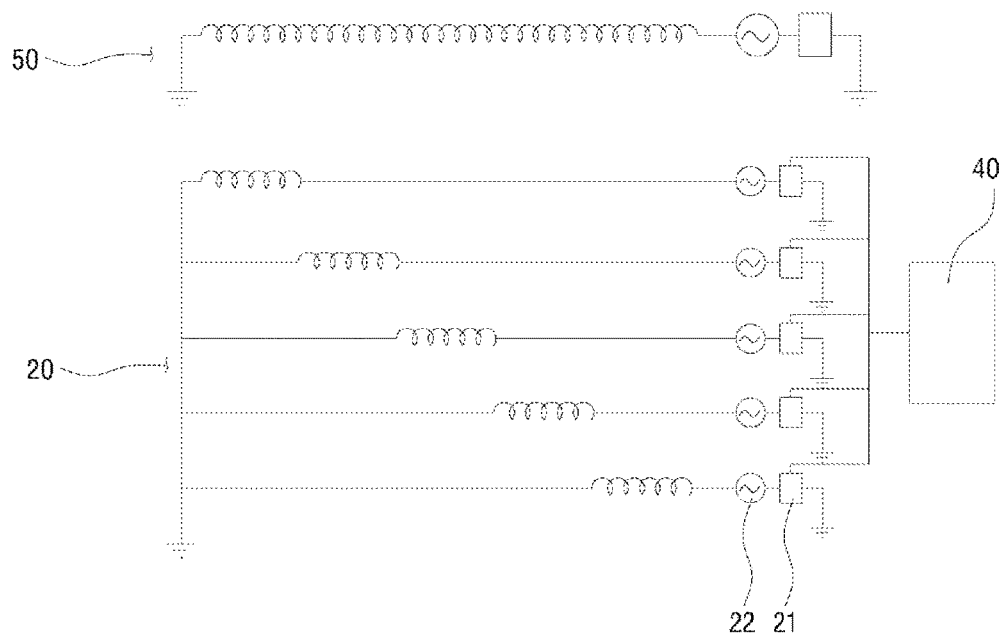
FIG. 5 is a view illustrating a control structure for the common heating unit and the sub-heating unit.

FIG. 5 is a view illustrating a control structure for the common heating unit and the sub-heating unit.

In the heater for a sealing process of a secondary battery according to the present embodiment, the common heating unit 50 and the plurality of sub-heating units 20 each have a current controller 21 controlling the amount of input current and are independently controlled by the current controllers 21.

The plurality of sub-heating units 20, preferably, each may further include a power supplier 22.

In general, a heating device that uses electric power is heated in proportion to the current that is applied to the heating device.

In the present embodiment, the current controller 21 is provided for each of the common heating unit 50 and the plurality of sub-heating units 20, whereby temperatures may be independently controlled.

Further, since the power suppliers 22 are separately further provided, the limits of power consumption of the power suppliers are not shared.

In the heater for a sealing process of a secondary battery according to the present embodiment, the common heating unit 50 and the plurality of sub-heating units 20 are heat coils.

Figure 6:
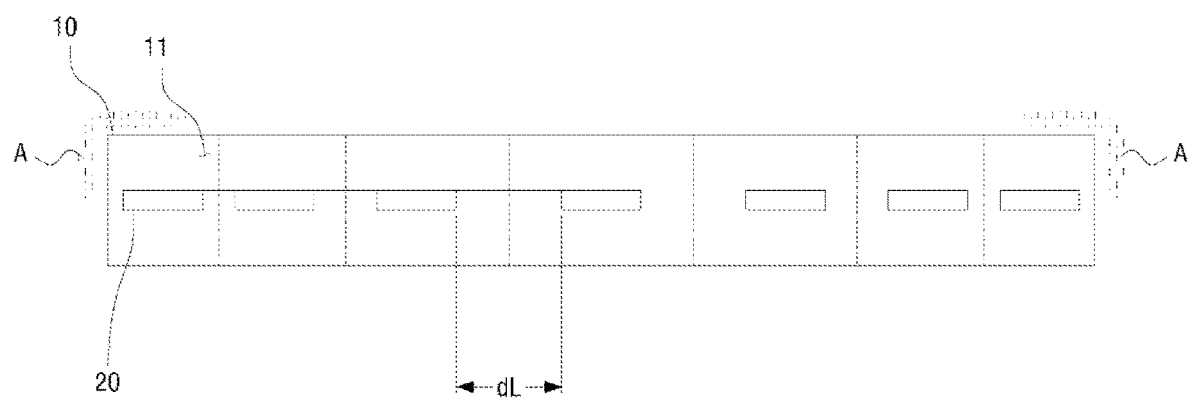
FIG. 6 is a view illustrating an arrangement structure of sub-heating units.

FIG. 6 is a view illustrating an arrangement structure of sub-heating units.

Referring to FIG. 6, in the heater for a sealing process of a secondary battery according to the present embodiment, the plurality of sub-heating units 20 is arranged such that the gaps dL increase toward the center portion from both ends of the sealing bar 10.

The volumes of the plurality of sections 11 may also be gradually increased toward the center portion from both ends of the sealing bar 10, respectively.

If a plurality of adjacent sections 11 is not completely insulated from each other, heat may transfer therebetween.

That is, heat generated by each of the plurality of sub-heating units 20 may heat the plurality of sections 11, respectively, and then transfer to other plurality of adjacent sections 11.

When the plurality of sub-heating units 20 is closed to each other, the sections may be further increased in temperature by the heat transferring to each other.

However, when the plurality of sub-heating units 20 is sufficiently spaced apart from each other, the plurality of sections 11 is heated only by the heat generated by the plurality of corresponding sub-heating units 20.

Accordingly, additional heating by heat transferring from adjacent sub-heating units 20 does not occur.

Heat dissipation due to air unavoidably is generated on the surface of the sealing bar 10.

As described above, since the cylinder and the isolator are disposed at the center portion of the sealing bar 10, a small area of the surface of the sealing bar 10 is exposed in the air.

However, in the regions A at both ends of the sealing bar 10 shown in FIG. 6, a large surface area is in contact with air. Accordingly, heat dissipation is active more than the center portion of the sealing bar 10.

That is, the loss of heat per unit time at both ends of the sealing bar 10 is larger than the loss of heat per unit time at the center portion of the sealing bar 10.

Accordingly, when the plurality of sub-heating units 20 is arranged, as shown in FIG. 6, it is possible to compensate for a loss due to heat dissipation at both ends of the sealing bar 10.

In another embodiment of the heater for a sealing process of a secondary battery according to the present disclosure, the sealing bar may be designed such that the heat dissipation efficiency decreases toward both longitudinal ends from the center portion.

As described above, since the isolator is disposed at the center portion of the sealing bar, heat dissipation through the cylinder is prevented.

However, heat is dissipated due to contact with air at both ends of the sealing bar. In particular, the air heated on the surface of the sealing bar rises through convection and non-heated air is supplied.

Accordingly, heat is continuously dissipated at both ends of the sealing bar.

In general, the sealing bar has to seal a large number of secondary battery pouch foils after being heated once. That is, sealing temperature should be maintained uniformly and precisely while secondary battery pouch foils are sealed.

As described above, when heat is continuously dissipated at specific regions, that is, at both ends of a sealing bar, a plurality of sub-heating units has to continuously generate heat.

However, it is possible to minimize heat dissipation by applying different heat dissipation efficiencies, depending on positions on the sealing bars.

In order to decrease heat dissipation efficiency, a sealing bar, preferably, may be designed such that the circumference of a cross-section perpendicular to the longitudinal direction decreases toward both longitudinal ends from the center portion.

A circle may be exemplified as the shape of which a cross-section decreases in circumference. That is, when a cross-section in the longitudinal direction of a sealing bar is formed in a circle, the surface area decreases than the center portion.

Further, since there is no protrusion, heat dissipation efficiency may decrease.

According to the present disclosure, since the temperature of a sealing bar is separately controlled in a plurality of sections by a plurality of sub-heating units, it is possible to achieve a uniform sealing quality regardless of a sealing position of a pouch foil.

While the present disclosure has been shown and described in connection with the exemplary embodiments, it will be apparent to those skilled in the art that modifications and variations can be made without departing from the spirit and scope of the disclosure as defined by the appended claims.

What is claimed is:

1. A heater for a sealing process of a secondary battery, the heater comprising:
   a sealing bar heating and pressing a pouch foil to be sealed;
   a plurality of sub-heating units longitudinally disposed inside the sealing bar to respectively independently supply heat to a plurality of sections separated in the longitudinal direction of the sealing bar;
   temperature sensing units disposed inside the sealing bar and sensing temperature at positions on surfaces being in contact with the pouch foil; and a control unit controlling heating temperature of the plurality of sub-heating units on the basis of the temperature sensed by the temperature sensing units, wherein heat dissipation efficiency of the sealing bar decreases toward both longitudinal ends from a center portion thereof.

2. The heater of claim 1, further comprising a common heating unit longitudinally disposed inside the sealing bar to supply heat to all of the sections covered by the plurality of sub-heating units.

3. The heater of claim 2, wherein the sealing bar has an accommodation groove in which the common heating unit is disposed, and the plurality of sections to which heat is supplied by the plurality of sub-heating units covers the entire length of the accommodation groove.

4. The heater of claim 2, wherein the common heating unit and the plurality of sub-heating units each have a current controller controlling an amount of input current, and are independently controlled by the current controllers.

5. The heater of claim 2, wherein the common heating unit and the plurality of sub-heating units are heat coils.

6. A heater for a sealing process of a secondary battery, the heater comprising:
- a sealing bar heating and pressing a pouch foil to be sealed;
- a plurality of sub-heating units longitudinally disposed inside the sealing bar to respectively independently supply heat to a plurality of sections separated in the longitudinal direction of the sealing bar;
- temperature sensing units disposed inside the sealing bar and sensing temperature at positions on surfaces being in contact with the pouch foil; and
- a control unit controlling heating temperature of the plurality of sub-heating units on the basis of the temperature sensed by the temperature sensing units,
- wherein the plurality of sub-heating units is arranged such that gaps therebetween increase toward a center portion from both longitudinal ends of the sealing bar.

* * * * *